(12) United States Patent  (10) Patent No.: US 7,940,496 B2
Vanderheyden  (45) Date of Patent: May 10, 2011

(54) REINFORCED TAPE FOR A DATA STORAGE DEVICE

(75) Inventor: William J. Vanderheyden, Loveland, CO (US)

(73) Assignee: Oracle America, Inc., Redwood City, CA (US)

( * ) Notice: Subject to any disclaimer, the term of this patent is extended or adjusted under 35 U.S.C. 154(b) by 1090 days.

(21) Appl. No.: 11/615,423

(22) Filed: Dec. 22, 2006

(65) Prior Publication Data

US 2008/0151425 A1    Jun. 26, 2008

(51) Int. Cl.
G11B 5/78 (2006.01)
G11B 15/18 (2006.01)

(52) U.S. Cl. .................................................. 360/132

(58) Field of Classification Search .................. 360/128, 360/132, 134
See application file for complete search history.

(56) References Cited

U.S. PATENT DOCUMENTS

| 4,893,209 | A | * | 1/1990 | Siddiq ........................... 360/128 |
| 5,295,636 | A | * | 3/1994 | Sugita ........................... 242/343 |
| 5,841,613 | A | * | 11/1998 | DeMaster et al. ............ 360/128 |
| 6,154,342 | A | | 11/2000 | Vanderheyden et al. |
| 7,086,623 | B2 | * | 8/2006 | Sato et al. .................. 242/348.2 |
| 7,287,714 | B2 | * | 10/2007 | Nishiwaki ..................... 242/341 |
| 2005/0213247 | A1 | * | 9/2005 | Doushita ....................... 360/132 |
| 2007/0133127 | A1 | * | 6/2007 | Stamm et al. ................. 360/128 |

* cited by examiner

*Primary Examiner* — Jefferson Evans
(74) *Attorney, Agent, or Firm* — Brooks Kushman P.C.

(57) ABSTRACT

A data storage device is disclosed with a housing sized for a tape drive. A tape reel is mounted for rotation within the housing and a guide is mounted in the housing spaced apart from the tape reel. A first end of a data tape segment is mounted to the tape reel and a second end is not mounted to the tape reel. A structural tape segment has a pair of ends mounted between the first and second ends of the data tape segment for structurally enhancing an intermediate region of the data tape segment. In another embodiment, a structurally enhanced intermediate region is advanced to a read/write region of the data storage device during storage of the device for preventing inadvertent damage to the data tape.

20 Claims, 4 Drawing Sheets

REINFORCED TAPE FOR A DATA STORAGE DEVICE

BACKGROUND OF THE INVENTION

1. Field of the Invention

The present invention relates to tape for data storage devices.

2. Background Art

Data storage devices such as data storage tape cartridges, have been employed in the computer, audio, video, and related arts. Data storage tape devices are often employed for recording and storing large quantities of data, such as media, for subsequent access and use.

U.S. Pat. No. 6,154,342 issued to Vanderheyden, et al. on Nov. 28, 2000, and discloses a data storage tape device, the disclosure of which is incorporated in its entirety by reference herein. The data storage tape device is provided with a housing, which contains a pair of tape reels and a length of magnetic storage tape. The storage tape is wrapped around a hub portion of one of the tape reels and is driven through a defined tape path by a driving system. The housing is provided with a cover and a base, with an opening for permitting access to the storage tape by a read/write head of a tape drive. Accordingly, data may be stored upon the media storage tape device by the read/write head of the tape drive and the data storage tape device may subsequently be transferred to a storage location for subsequent retrieval, and further reading and/or writing to the magnetic storage tape.

Alternatively, the prior art has provided single reel devices wherein the magnetic storage tape is stored upon a reel within the device and the tape is partially extracted from the device for reading and/or writing by a read/write head of a tape drive.

The Vanderheyden, et al., U.S. Pat. No. 6,154,342 discloses a reinforcing tape reel lock for preventing the associated tape reel (or reels) to freely rotate within the housing. The tape reel lock prevents rotation of the tape reels relative to the housing to prevent the storage tape from becoming loose within the housing, thereby preventing the storage tape from becoming temporarily or permanently displaced from a desired tape path, creasing, or other inadvertent damage to the media storage tape. By preventing such damage to the data storage tape, the data stored upon the tape is thereby preserved.

SUMMARY OF THE INVENTION

One embodiment of the present invention discloses a data storage device with a housing that defines a cartridge to cooperate with a tape drive. A tape reel is mounted for rotation within the housing and a guide is mounted within the housing spaced apart from the tape reel. A data tape segment has a first end mounted to the tape reel and a second end that is not mounted the tape reel. A structural tape segment has a pair of ends that are mounted between the first and second ends of the data tape segment for structurally enhancing an intermediate region of the data tape.

Another embodiment of the present invention discloses a media storage cartridge with a housing sized to cooperate with a tape drive. The housing has a window for access of a read/write head of the tape drive. A pair of tape reels are mounted for rotation within the housing. A first data tape portion has a first end mounted to one of the pair of tape reels. A non-data tape portion has a thickness greater than that of the first data tape portion. The non-data tape portion has a first end mounted to a second of the first data tape portion. A second data tape portion is provided with a thickness that is less than that of a non-data tape portion. The second data tape portion has a first end mounted to a second end of the non-data tape portion. A second end of the second data tape portion is mounted to the other of the pair of tape reels. The first data tape portion, the non-data tape portion and the second data tape portion are collectively spooled upon the pair of tape reels such that the tape extends along the window to be accessed by the read/write head. Thus, the non-data tape portion can be advanced to extend along the window during storage to prevent inadvertent damage to the data tape portion during transfer of the media storage cartridge.

Yet another embodiment of the present invention discloses a method for storing a data storage device that is provided with a housing, a pair of tape reels, and a tape with a structurally enhanced intermediate region between data tape regions, which are each mounted to one of the pair of tape reels. The intermediate region of the tape is advanced to a read/write region of the data storage device. The media storage device is stored for subsequent read/write access of the data tape regions.

The above embodiments, and other embodiments, aspects, objects, features, advantages, and benefits of the present invention are readily apparent from the detailed description of embodiments of the present invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
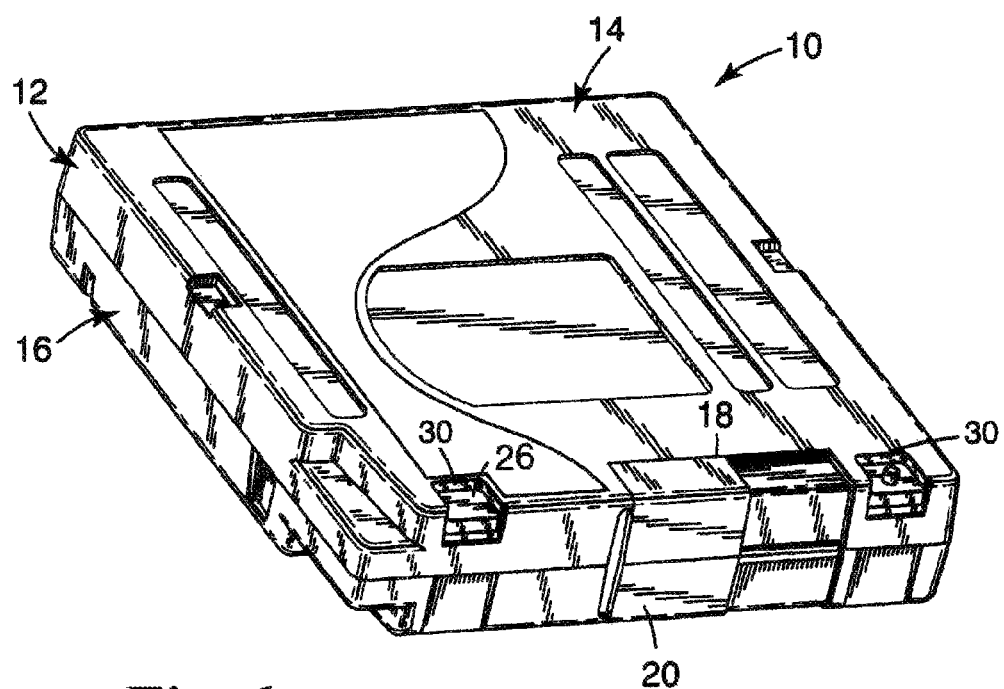
FIG. 1 is a perspective view of a data storage device according to one embodiment of the present invention.

With reference now to FIG. 1, a data storage device is depicted according to one embodiment of the present invention and referenced generally as a tape cartridge and is indicated generally by numeral 10. The tape cartridge 10 includes a housing 12, which provides the exterior structure of the data storage tape cartridge 10. The housing 12 is sized to be inserted into a tape drive (not shown) for communication between the tape cartridge 10 and the tape drive. In one embodiment, the housing 12 is sized to be inserted within a 5.25 inch (130 millimeter) form factor drive, a 3.5 inch (90 millimeter) form factor drive, or other suitable sizes. In one embodiment, the housing 12 is provided by a first housing portion 14 and a second housing portion 16 which are assembled together to retain and conceal the components of the tape cartridge 10.

The housing 12 includes an access opening 18 formed through the first and second housing portions 14, 16. The access opening 18 is oriented adjacent to a path of storage tape within the tape cartridge 10 for permitting access by a read/write head (not shown) of the tape drive. The tape cartridge 10 is provided with a door 20 mounted to the housing 12 that is translatable relative to the housing 12, for covering the access opening 18 as illustrated in FIG. 1. The door 20 is urged to the closed orientation of FIG. 1 by a spring (not shown). The door 20 can be translated to an open orientation by the tape drive for providing access to the opening 18 to the storage tape. In the closed orientation, the door 20 protects the storage tape from inadvertent damage by external contact, contamination, or the like.

Figure 2:
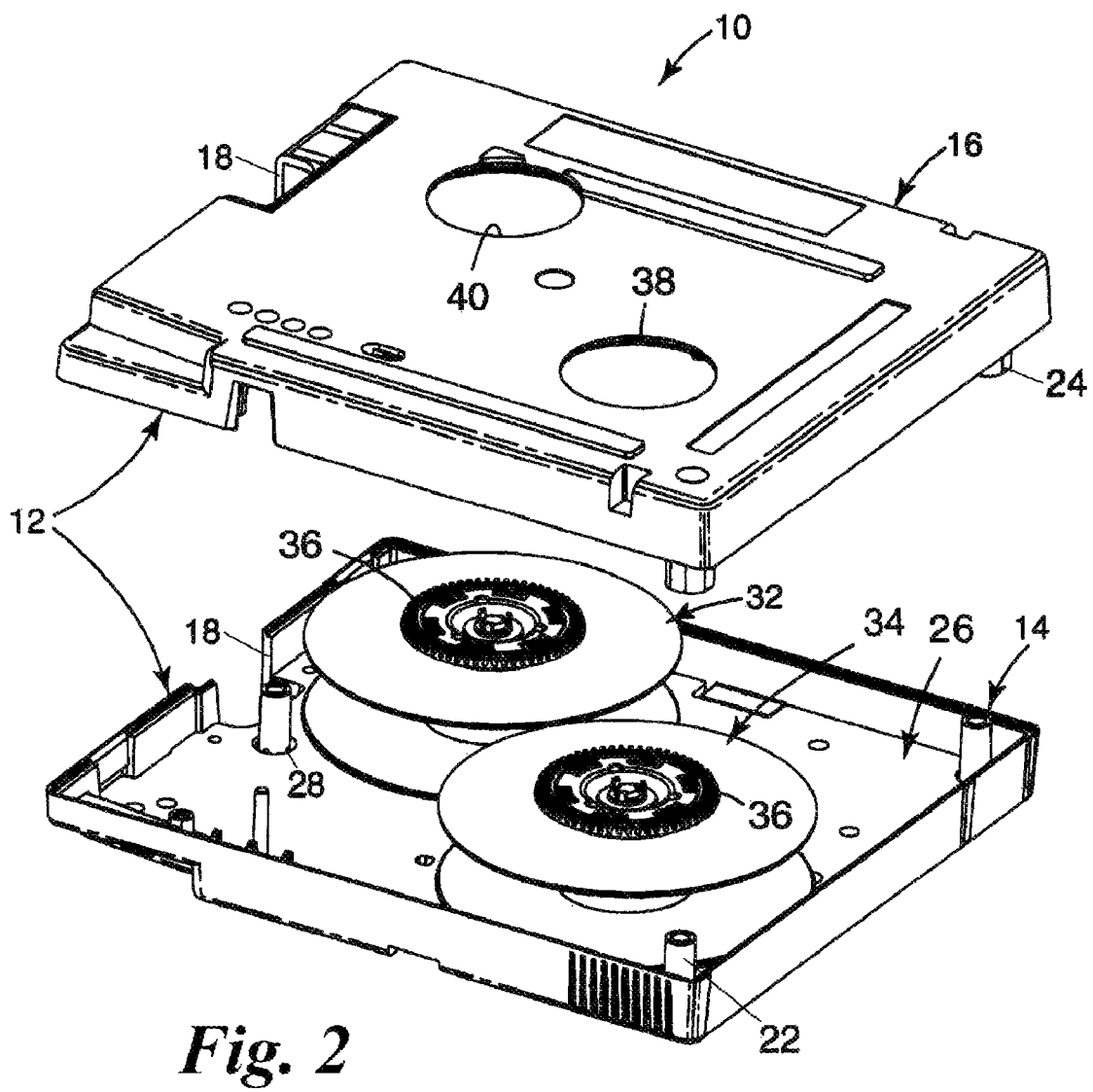
FIG. 2 is a partially exploded perspective view of the data storage device of FIG. 1.

Referring now to FIG. 2, the tape cartridge 10 is illustrated inverted from the view of FIG. 1, with the second housing portion 16 above the first housing portion 14. The second housing portion 16 is illustrated disassembled from the first housing portion 14 for revealing components within the housing 12. The first housing portion 14 is provided with a series of bosses 22 extending from an inner cavity of the first housing portion 14. Likewise, the second housing portion 16 is provided with a corresponding series of bosses 24 that are sized to receive the bosses 22 of the first housing portion. Additionally, a series of threaded fasteners (not shown) cooperate with the bosses 22, 24 of the first and second housing portions 14, 16 for fastening the housing 12 together.

A substrate 26 is provided within one of the housing portions, such as first housing portion 14, and includes a series of cutouts 28 for providing clearance to the corresponding bosses 22 and for aligning the substrate 26 relative to the first housing portion 14. The housing portions 14, 16 may be formed from any suitable material, such as an injection molded high strength polymer. The substrate 26 may be formed of any suitable material, such as aluminum. Additionally, the substrate 26 is aligned axially relative to the bosses 22 by the bosses 24 of the second housing portion 16 which engage a top surface of the substrate 26 when assembled. Referring again to FIG. 1, the housing 12 includes a pair of recesses 30, which reveal a portion of the substrate 26 in the assembled state of the tape cartridge 10.

FIG. 2 illustrates a tape cartridge 10, of one embodiment, that includes a pair of tape reels 32, 34, which are each mounted for rotation upon the substrate 26. Each tape reel 32, 34 includes a central hub for retaining storage tape thereabout. Additionally, each tape reel 32, 34 includes a pair of spaced apart flanges oriented at axial ends of the hub for facilitating retention of storage tape about the hubs. Additionally, each tape reel 32, 34 is provided with a coupling 36 for being mechanically driven by the tape drive, as set forth in the Vanderheyden, et al. U.S. Pat. No. 6,154,342. The second housing portion 16 is appropriately provided with a pair of apertures 38, 40 so that the tape drive may connect to the couplings 36 of the tape reels 32, 34 for driving the tape reels 32, 34.

Figure 3:
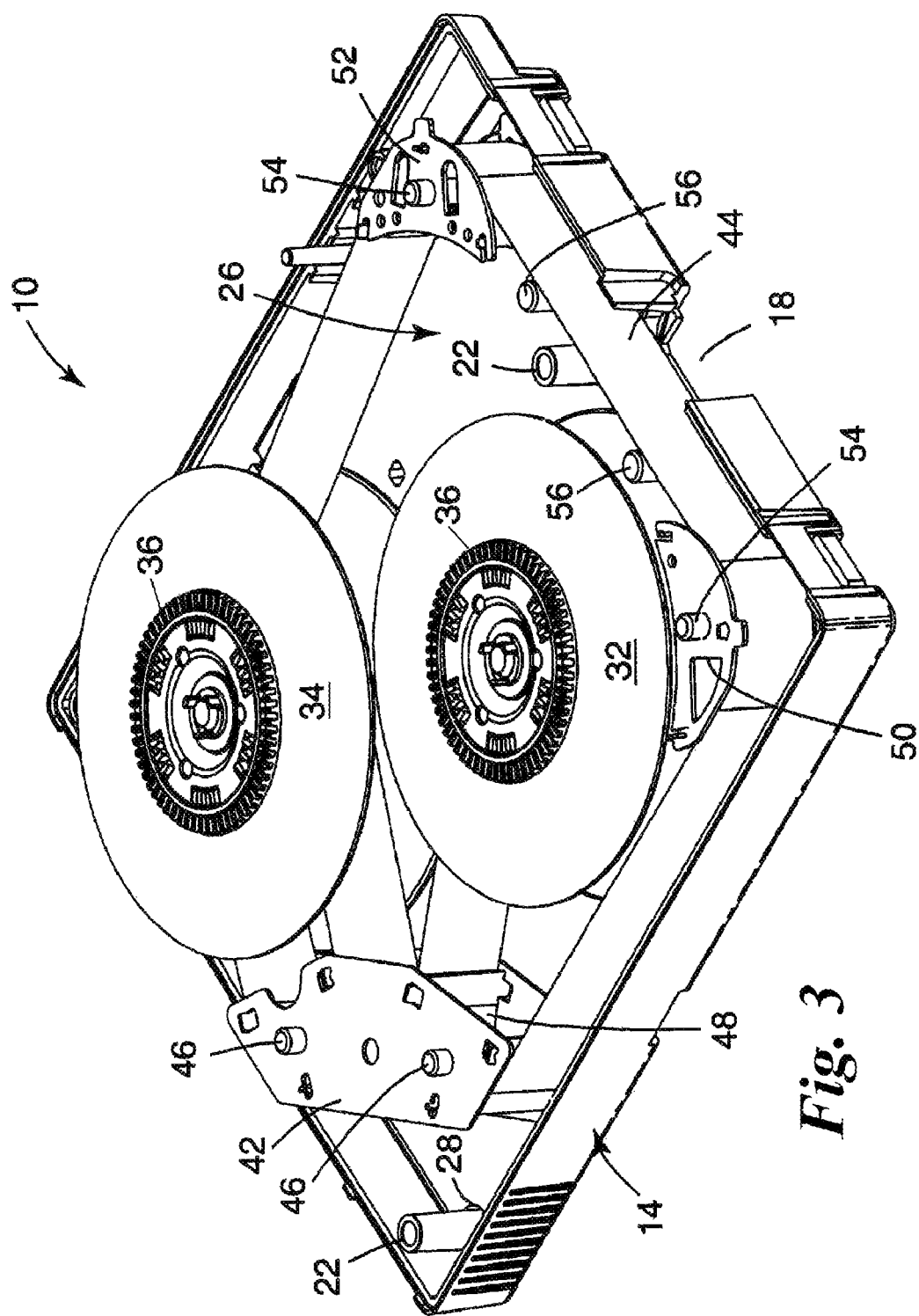
FIG. 3 is a partially disassembled perspective view of the data storage device of FIG. 1.

FIG. 3 illustrates a cartridge 10 rotated approximately 180 degrees from that illustrated in FIG. 2 with the second housing portion 16 removed. The tape cartridge 10 is illustrated further assembled. In one embodiment, the tape cartridge 10 includes a dual corner guide assembly 42 mounted to the substrate 26 at one corner of a perimeter of the housing 10. The dual corner guide assembly 42 guides storage tape 44 to both of the tape reels 32, 34. The dual corner guide assembly 42 is secured to the base plate 18 by a pair of pins 46. The dual corner guide assembly includes a pair of arcuate guides 48 for guiding the storage tape 44 from each of the reels 32, 34 to the dual corner guide assembly 42 and about a perimeter of housing 10 along a guided tape path.

A pair of singular corner guides assemblies 50, 52 are provided at corners within a perimeter of the housing 12 on opposed sides of the access opening 18. The singular corner guide assemblies, 50, 52 may each be mounted to the substrate 26 by a pin 54 and may include a brake as disclosed in the Vanderheyden et al. U.S. Pat. No. 6,154,342. Additionally, a pair of pin guides 56 are mounted to the substrate 26 for rotation and are oriented adjacent to the access opening 18 for guiding the storage tape 44 along the opening 18 for access by the tape drive read/write head.

The storage tape 44 has an overall length that is spooled upon one or more of the hubs of the tape reels 32, 34. The storage tape 44 extends, for example, from the first tape reel 32 to the arcuate guide 48 of the dual corner guide assembly 42, then about the perimeter of the housing 12 to the first singular corner guide assembly 50, then along the pin guides 56 adjacent to the access opening 18, then about the second singular corner guide assembly 52, then to the other arcuate guide 48 (not shown) of the dual corner guide assembly 42 and to the second tape reel 34. As the tape reels 32, 34 are driven by the tape drive, the storage tape 44 is conveyed about the guides 42, 50, 56, along the tape path for translating the tape to and along the read/write head at the access opening 18.

Figure 4:
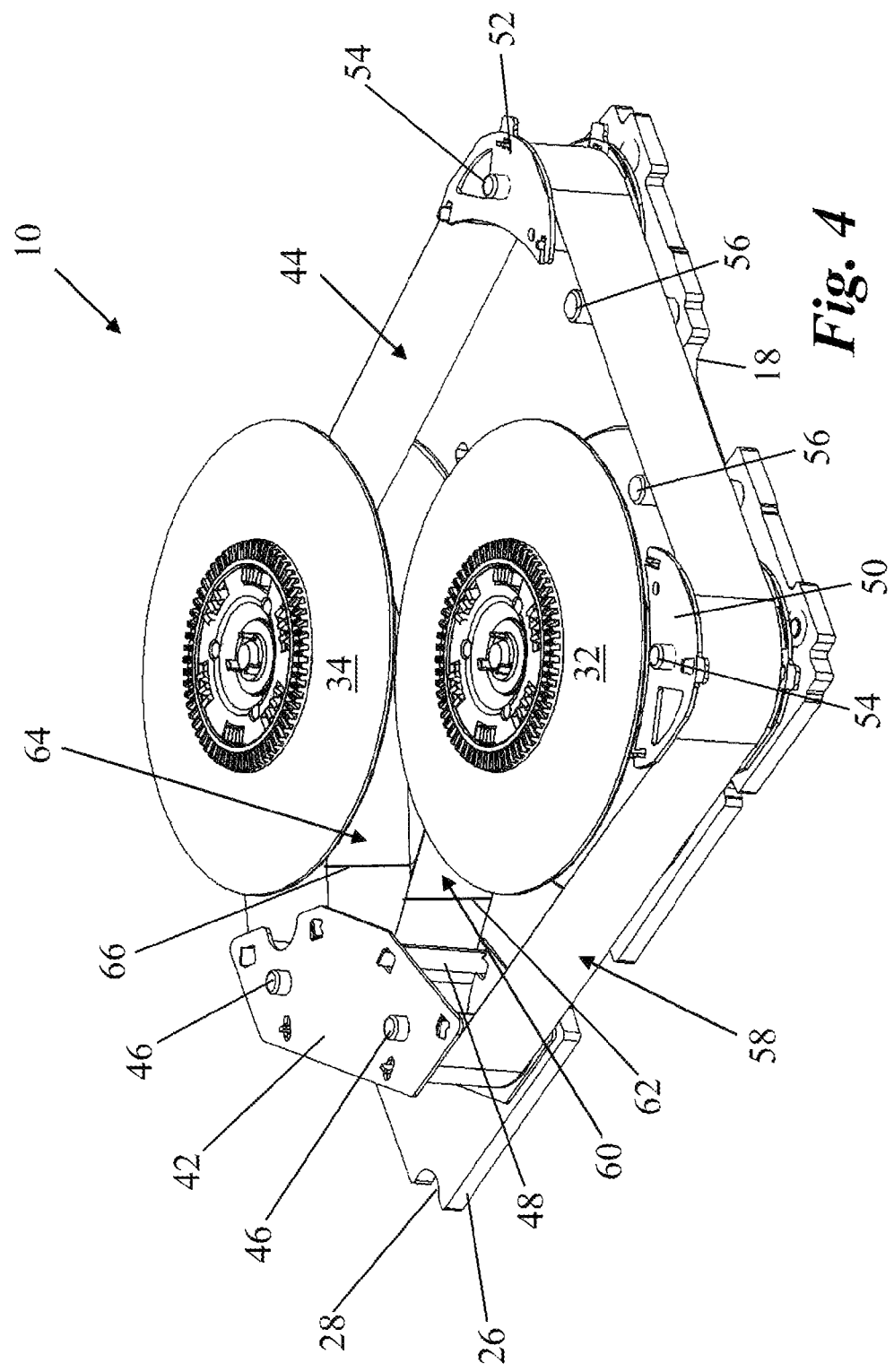
FIG. 4 is a further disassembled perspective view of the data storage device of FIG. 1.

Referring now to FIG. 4, the tape cartridge 10 is illustrated with both housing portions 14, 16 removed for further revealing the components upon substrate 26. The storage tape 44 is a magnetic tape of a type commonly known in the art. For example, storage tape 44 may be provided by a balanced polyethylene naphthalate (PEN) based material coated on one side with a magnetic layer dispersed within a suitable binder system, and on the other side with a conductive material also dispersed within a suitable binder system.

For dual reel tape cartridges, such as the tape cartridge 10 depicted in FIG. 4, it is advantageous to center park the cartridge before storage of the cartridge. In other words, it is advantageous to advance the storage tape 44 upon the reels 32, 34 so that a generally equivalent amount of storage tape 44 is spooled upon each reel 32, 34. By center parking the storage tape, access to any data upon the storage tape 44 is expedited by advancing the storage tape 44 to desired data from a center of an overall length of the storage tape. For example, if the storage tape 44 were parked at one end, and data was to be retrieved at the other end of the storage tape 44, the entire length of the storage tape 44 would need to be advanced. By center parking the storage tape 44, the read/write head of the tape drive, is a shortest distance from all accessible locations upon the storage tape 44.

Thus, the tape cartridge 10 is typically center parked when ejected from the tape drive with an equal amount of storage tape 44 on each of the reels 32, 34. The segment of tape that remains in the tape path, (not spooled about the tape reels 32, 34), during transfer of the tape cartridge 10 may be subject to damage. For example, during ejecting, handling, shipping, and/or mishandling of the tape cartridge 10, the reels 32, 34 may translate axially relative to the guides 42, 50, 52, 56 in the tape path. These conditions may cause stress or bending to the storage tape 44 along its edges. If the guide assemblies 42, 50, 52 are provided with additional compliancy features, the storage tape 44 may buckle when tension is removed from the storage tape 44 during ejection of the cartridge 10, thereby causing potential damage. Additionally, when tension is removed from the storage tape 44, the storage tape 44, can move off of the guide path and overhang the flanges of the reel assemblies 32, 34 or flanges of the guide assemblies 42, 50, 52. When the storage tape 44 overhangs the flanges of these components, the storage tape 44 may be damaged, during handling or subsequent tensioning.

Additionally, damage may be caused to the storage tape 44 during the load process when the storage tape 44 is tensioned to remove slack and to center the tape 44 along the guide assemblies 42, 50, 52. Dual reel cartridges such as the tape cartridge 10 are further evolving. Such improvements include utilization of thinner data tape to achieve increased capacity. Thinner data tape is even more susceptible to damage than data tape of a larger thickness.

To minimize damage to the storage tape 44, the storage tape 44 includes a structural tape segment 58 provided at a intermediate region of the storage tape 44. The structural tape segment 58 engages the guide assemblies 42, 50, 52 in the center parked position of the data tape 44 to minimize inadvertent damage to the storage tape 44 in the conditions discussed above. Accordingly, a first data tape segment 60 is provided with a first end mounted to the hub of the first tape reel assembly 32. The first data tape segment 60 is spooled about the first tape reel 32 with a second end 62 that engages a first end 62 of the structural tape segment 58. Likewise, a second data tape segment 64 is provided with a first end mounted to a hub of the second tape reel assembly 34. The second data tape segment 64 is spooled upon the second tape reel assembly 34 and includes a second end 66 mounted to a second end 66 of the structural tape segment 58.

The structural tape segment 58 has a thickness greater than that of the data tape segments 60, 64 to withstand potential damaging conditions in the loading, unloading and transfer of the tape cartridge 10. In one embodiment, the structural tape segment 58 has a thickness that is about two and a half times the thickness of the data tape segments 60, 64. Accordingly, this increased thickness provides the structural tape segment 58 with a bending strength that is fifteen times that of the data tape segments 60, 64. For example, the data tape segments may have a thickness of approximately six and a half microns, wherein the structural tape has a thickness of approximately seventeen microns. Of course, these dimensions are merely examples, and any suitable ratio of thicknesses is contemplated in the spirit and scope of the present invention.

As discussed above, it is desirable to center park the storage tape 44 before unloading the tape cartridge 10 from the associated tape drive. Accordingly, the structural tape segment 58 is provided at a center of the length of the storage tape 44. In other words, the data tape 60, 64 may be bisected by the structural tape segment 58. In one embodiment, the structural tape segment 58 may be bonded to each of the data tape segments 60, 64 by adhesive splice tape 62, 66 at the intersection of the structural and data tape segments 58, 60, 64.

The utilization of the structural tape segment 58 overcomes the failures and difficulties discussed with center parking a tape cartridge 10. Tape damage that occurs in loading, unloading and transferring of the tape cartridge 10 may be minimized thereby reducing the occurrences of a break in storage tape 44 and/or a loss of data. Additionally, the structural tape segment 58 may be provided without data so that in the occurrence of damage or a break to the structural tape segment 58, data will not be lost.

By utilizing the structural tape segment 58, the data tape segments 60, 64 may utilize a thinner tape than ordinarily provided thereby increasing the capacity of data tape upon the tape reels 32, 34 and consequently increasing the capacity of the data cartridge 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage device comprising:
   a housing defining a cartridge sized to cooperate with a tape drive;
   at least one tape reel mounted for rotation within the housing;
   at least one guide mounted within the housing spaced apart from the at least one tape reel;
   a data tape segment having a first end mounted to the at least one tape reel and a second end that is not mounted to the at least one tape reel; and
   a structural tape segment having a pair of ends that are mounted between the first and second ends of the data tape segment for structurally enhancing an intermediate region of the data tape segment;
   wherein the structural tape segment has a thickness that is generally two and a half times a thickness of the data tape segment.

2. The data storage device of claim 1 further comprising an access opening formed in the housing adjacent to a tape path of the tape for access to the tape by a read/write head of a tape drive, wherein the structural tape segment may be advanced in the tape path adjacent to the access opening for minimizing damage to the data tape segment during transfer or storage of the cartridge.

3. The data storage device of claim 1 further comprising a second tape reel mounted for rotation within the housing spaced apart from the at least one tape reel and the data tape second end is mounted to the second tape reel.

4. The data storage device of claim 1 wherein the at least one guide further comprises flanges and the structural tape segment is advanced to a position extending out of the flanges for minimizing damage to the data tape segment during transfer or storage of the cartridge.

5. The data storage device of claim 1 wherein the structural tape segment has a bending strength fifteen times that of the data tape segment.

6. The data storage device of claim 1 wherein the at least one tape guide further comprises a series of tape guides and the structural tape segment has a length to be displaced about the guides for minimizing damage to the data tape segment during transfer or storage of the cartridge.

7. The data storage device of claim 6 wherein the series of tape guides are oriented about a perimeter of the housing.

8. The data storage device of claim 1 wherein the structural tape segment bisects the data tape segment.

9. The data storage device of claim 8 further comprising adhesive splice tape connecting the structural tape segment to the data tape segment.

10. The data storage device of claim 1 wherein the data tape segment has a thickness of approximately six and one half microns.

11. The data storage device of claim 10 wherein the structural tape segment has a thickness of approximately seventeen microns.

12. A media storage cartridge comprising:
   a housing sized to cooperate with a tape drive, the housing having an access opening for access of a read/write head of the tape drive;
   a pair of tape reels mounted for rotation within the housing;
   a first data tape portion having a first end mounted to one of the pair of tape reels and a second end;
   a non-data tape portion having a thickness greater than that of the first data tape portion, the non-data tape portion having a first end mounted to the second end of the first data tape portion and a second end; and a second data tape portion having a thickness less than the thickness of the non-data tape portion, the second data tape portion having a first end mounted to the second end of the non-data tape portion and a second end mounted to the other of the pair of tape reels;

wherein the first data tape portion, the non-data tape portion and the second data tape portion are collectively spooled upon the pair of tape reels such that the tape extends along the access opening to be accessed by the read/write head, so that the non-data tape portion can be advanced by the tape drive to extend along the access opening during storage to prevent inadvertent damage to the data tape portions during transfer of the media storage cartridge; and wherein the non-data tape portion has a bending strength fifteen times that of the first and second data tape portions.

13. The media storage cartridge of claim 12 wherein the non-data tape portion has a thickness greater than that of the first and second data tape portions.

14. The media storage cartridge of claim 12 wherein the non-data tape is oriented generally in a center of an overall length of the data tape portions.

15. A method for storing a data storage device comprising:
providing a data storage device with a housing, a pair of tape reels in the housing;
providing a tape with a structurally enhanced intermediate region between data tape regions that are each mounted to one of the pair of tape reels;
advancing the intermediate region of the tape to a read/write region of the data storage device; and
storing the data storage device for subsequent read/write access.

16. The method of claim 15 further comprising providing the structurally enhanced intermediate region centrally between the data tape regions.

17. The method of claim 15 further comprising:
providing the data storage device with at least one tape guide; and
advancing the intermediate region of the tape to the at least one guide prior to storing the data storage device.

18. The method of claim 17 further comprising:
providing the at least one tape guide with flanges; and
advancing the intermediate region of the tape to the a position extending out of the flanges prior to storing the data storage device.

19. The method of claim 15 further comprising:
providing the data storage device with a series of tape guides;
providing the intermediate region of the tape with a length to be displaced about the guides; and
advancing the intermediate region of the tape to the series of guides prior to storing the data storage device.

20. The method of claim 15 further comprising:
providing each of the pair of tape reels with flanges; and
advancing the intermediate region of the tape to a position extending out of the flanges prior to storing the data storage device.

* * * * *